United States Patent [19]

Tiedt et al.

[11] Patent Number: 5,435,441

[45] Date of Patent: Jul. 25, 1995

[54] PACKING SUPPORT FOR MOVEABLE ARTICLES WITHIN A REFRIGERATOR CABINET

[75] Inventors: Maurice R. Tiedt, Warrick County, Ind.; Devin K. Cochran, Greenwood; Tariq A. Diab, Van Buren, both of Ark.; Gregg A. Greulich, Monroe Township, Miami County, Ohio

[73] Assignee: Whirlpool Corporation, Benton Harbor, Mich.

[21] Appl. No.: 142,015

[22] Filed: Oct. 28, 1993

[51] Int. Cl.6 ............................................. B65D 85/00
[52] U.S. Cl. .................................. 206/320; 206/524; 53/474; 53/472
[58] Field of Search ............... 53/472, 474; 206/523, 206/524, 522, 320

[56] References Cited

U.S. PATENT DOCUMENTS

| | | | |
|---|---|---|---|
| 2,659,648 | 11/1953 | Robbins | 312/237 |
| 3,307,318 | 3/1967 | Bauman | 52/743 |
| 3,363,749 | 1/1968 | Tinapple | 206/320 |
| 3,412,521 | 11/1968 | Bauman | 53/36 |
| 3,485,347 | 12/1969 | McGill et al. | 206/46 |
| 3,870,741 | 3/1975 | Kuhn | 206/524 |
| 4,317,516 | 3/1982 | Palmer-Ball, Sr. | 206/320 |
| 4,674,268 | 6/1987 | Gavronsky et al. | 53/468 |
| 4,800,708 | 1/1989 | Sperry | 53/449 |
| 4,811,840 | 3/1989 | Muyskens | 206/320 |
| 4,848,581 | 7/1989 | Besore et al. | 206/521 |
| 4,854,109 | 8/1989 | Pinarer et al. | 53/397 |
| 4,865,655 | 9/1989 | Fujita et al. | 148/33 |
| 4,938,007 | 7/1990 | Sperry | 53/449 |
| 4,999,975 | 3/1991 | Willden et al. | 53/451 |
| 5,027,583 | 7/1991 | Chelak | 53/451 |
| 5,115,915 | 5/1992 | Harris | 206/524 |

*Primary Examiner*—John Sipos
*Assistant Examiner*—Gene L. Kim
*Attorney, Agent, or Firm*—Thomas J. Roth; Joel M. Van Winkle

[57] ABSTRACT

A shipping support system for moveable articles within a refrigerator having an interior compartment containing a plurality of movable articles such as shelves and the like, wherein the packing support system includes a conformable bag containing expandable foam material. A shipping support is formed by dispensing the expandable foam into an open receiving end of the conformable bag and then the receiving end is sealed closed. Upon forming the shipping support, the conformable bag is secured to a door hingedly mounted to the refrigerator before the expandable foam has completely expanded and formed. Subsequently, the door is closed, capturing the conformable bag between the door and the moveable articles within the refrigerator. As the expandable foam expands, the conformable bag conforms to the configuration of the moveable articles such that the moveable articles are securely supported within the refrigerator cabinet.

7 Claims, 5 Drawing Sheets

PACKING SUPPORT FOR MOVEABLE ARTICLES WITHIN A REFRIGERATOR CABINET

BACKGROUND OF THE INVENTION

This invention relates to a packing support for retaining moveable articles against movement within a cabinet during shipment and, more particularly to a packing support to prevent movement of moveable shelves and drawers within a refrigerator cabinet during shipment.

Refrigerator cabinets are customarily provided with shelves which may be moveable or adjusted and, therefore, are not permanently fastened to the cabinet. Vegetable and meat drawers and the like are also frequently provided and may be moveably supported within the refrigerator cabinet. In preparing the cabinet for shipping, these drawers, shelves, etc. must be fastened so that they are substantially immoveable in the cabinet.

Various means have been used, therefore, for securing moveable articles within a refrigerator during shipment. One method involves individually fastening all moveable drawers, shelves and the like to the cabinet by some means such as using a plurality of special individually constructed cardboard or styrofoam packing parts, to secure the moveable articles. This method requires considerable time and cost in preparing the refrigerator for shipment and in maintaining an inventory of all of the special parts and is therefore undesirable.

Another system involves utilizing an elongated corrugated cardboard post for holding the moveable articles in the refrigerator as illustrated in U.S. Pat. No. 2,659,648, to C. G. Robbins. In this system, each moveable article is engaged by the corrugated post which extends vertically along the front portion of the refrigerator in front of the moveable shelves, drawers and the like. This system also has disadvantages, as each configuration of a refrigerator requires a unique elongated cardboard post construction. Further, installation of the cardboard posts is relatively difficult and time consuming and may not provide the required support of the moveable articles.

SUMMARY OF THE INVENTION

The present invention overcomes the disadvantages of previous refrigeration packing supports by providing a packing support system that is economical to manufacture, requires no inventory of special premanufactured parts, and is economical to install and remove.

Accordingly, one object of the present invention is to securely position moveable articles in a refrigerator cabinet using a packing support system which is relatively inexpensive and easy to manufacture, install and remove.

Another object is to provide a packing support system which may conform to various configurations of a refrigerator.

According to the present invention, the foregoing and other objects are attained by a packing support system for moveable articles within a refrigerator, wherein the packing support system includes a conformable bag containing expandable foam material. A shipping support is formed by dispensing the expandable foam into an open receiving end of the conformable bag and then sealing the receiving end closed. The conformable bag includes a vent means for venting gases produced during the expansion of the expanded foam. The refrigerator includes an interior compartment wherein the moveable articles such as shelves and the like are disposed. During the assembly of the refrigerator, the conformable bag is secured to a door hingedly mounted to the cabinet before the expandable foam has completely expanded and formed. Subsequently, the door is closed, capturing the conformable bag between the door and the moveable articles. As the expandable foam expands, the conformable bag conforms to the configuration of the moveable articles such that the moveable articles are securely supported within the refrigerator cabinet.

DESCRIPTION OF PREFERRED EMBODIMENT

Figure 1:
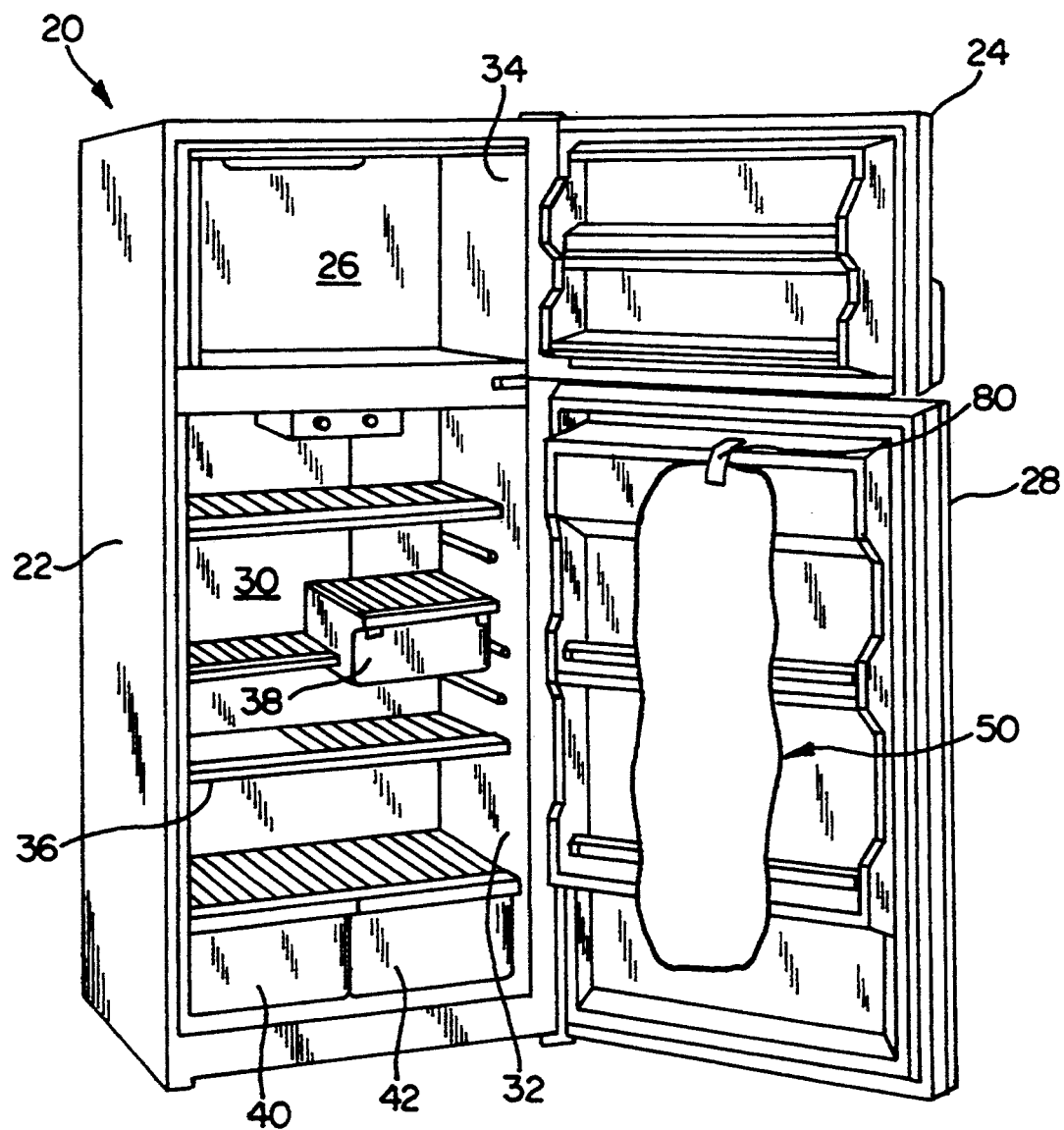
FIG. 1 is a front and side perspective view of a refrigerator including a packing support in accordance with the present invention.

In FIG. 1, there is shown generally a refrigerator appliance 20 which comprises an exterior cabinet 22 having a first openable door 24 to expose a first interior compartment or freezer compartment 26 and a second openable door 28 to expose a second interior compartment or fresh food compartment 30. The fresh food compartment 30 is defined by a fresh food inner liner 32. In a similar fashion, the freezer compartment 26 is defined by a freezer inner liner 34. Within each of the compartments 26, 30 there may be one or more shelves 36 for receiving articles.

It is common to use shelves formed as racks and resting them on buttons inserted into the inner liners 32 and 34. The inner liners 32 and 34 may also be formed to include a plurality of integrated, vertically spaced shelf supports (not shown). In this configuration, the shelf supports may slideably support the shelves 36. In addition to the shelves 36, a slideable meat drawer 38 and slideable vegetable drawers 40 and 42 may be provided within the fresh food compartment 30.

The shelves 36 and drawers 38, 40 and 42 are prone to move within the respective inner liners 32 and 34 during shipment, resulting in possible damage to the inner liners 32 and 34. To prevent such movement during shipment, a shipping support 50 is provided.

Figure 2:
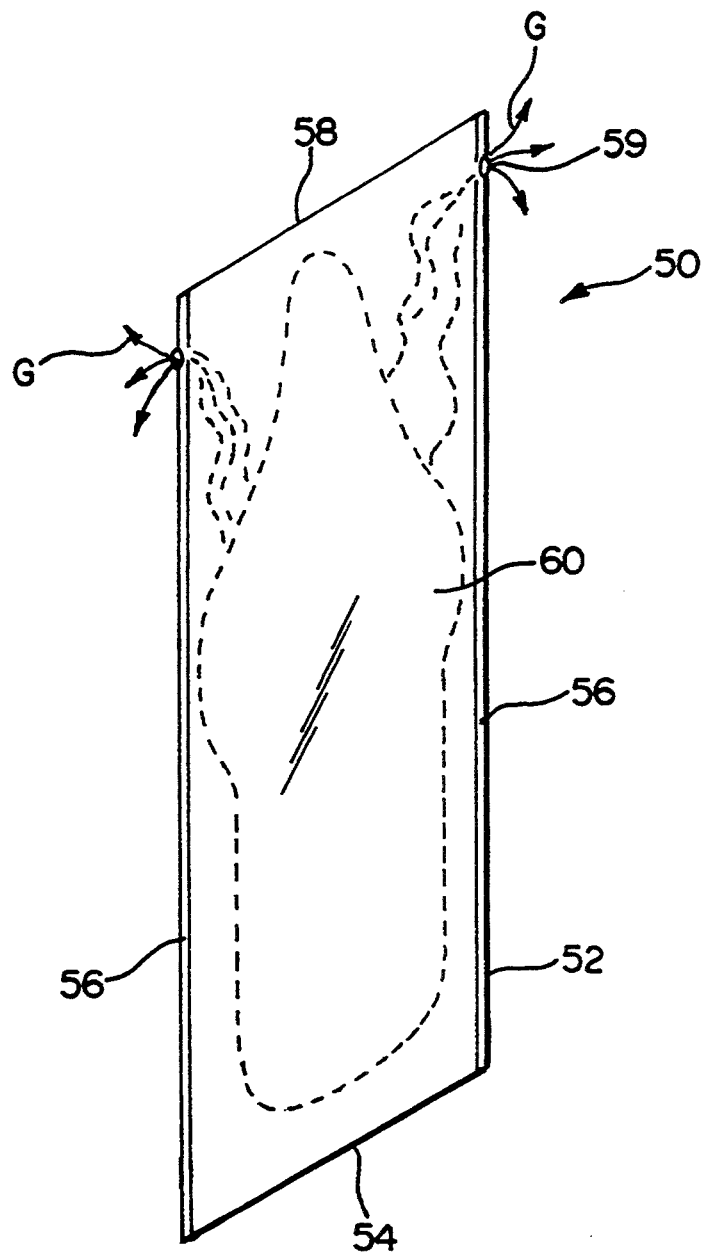
FIG. 2 is a detailed top, front and side perspective view of the packing support of FIG. 1.

The shipping support 50, as shown in greater detail in FIG. 2, may comprise a conformable bag 52. The conformable bag 52 may be constructed from two plastic webs W of high density polyethylene having a thickness of about 0.75 mils. which are heat sealed along the bottom edge 54, the side edges 56 and the top edge 58. Vent orifices 59 are also typically provided in the conformable bag 52.

During formation of the shipping support 50, a expandable foam 60 is injected within the conformable bag 52. The expandable foam 60 consists of a foamable composition which is well known to those of skill in the art and sometimes referenced as foaming agents or foam precursors. Generally, these foam materials are a combination of polymeric materials and either gases or gas-generating compounds. Typically, these foamable materials are designed to remain in a liquid form until released to atmospheric pressure and exposed to air. When released to atmospheric pressure and exposed to air, gas generation occurs such that gases permeate the polymeric material expanding the foam material up to approximately 200 times the original liquid volume. Gases G generated during the foam forming process escape from within the bag through the vent orifices 59.

Figure 3:
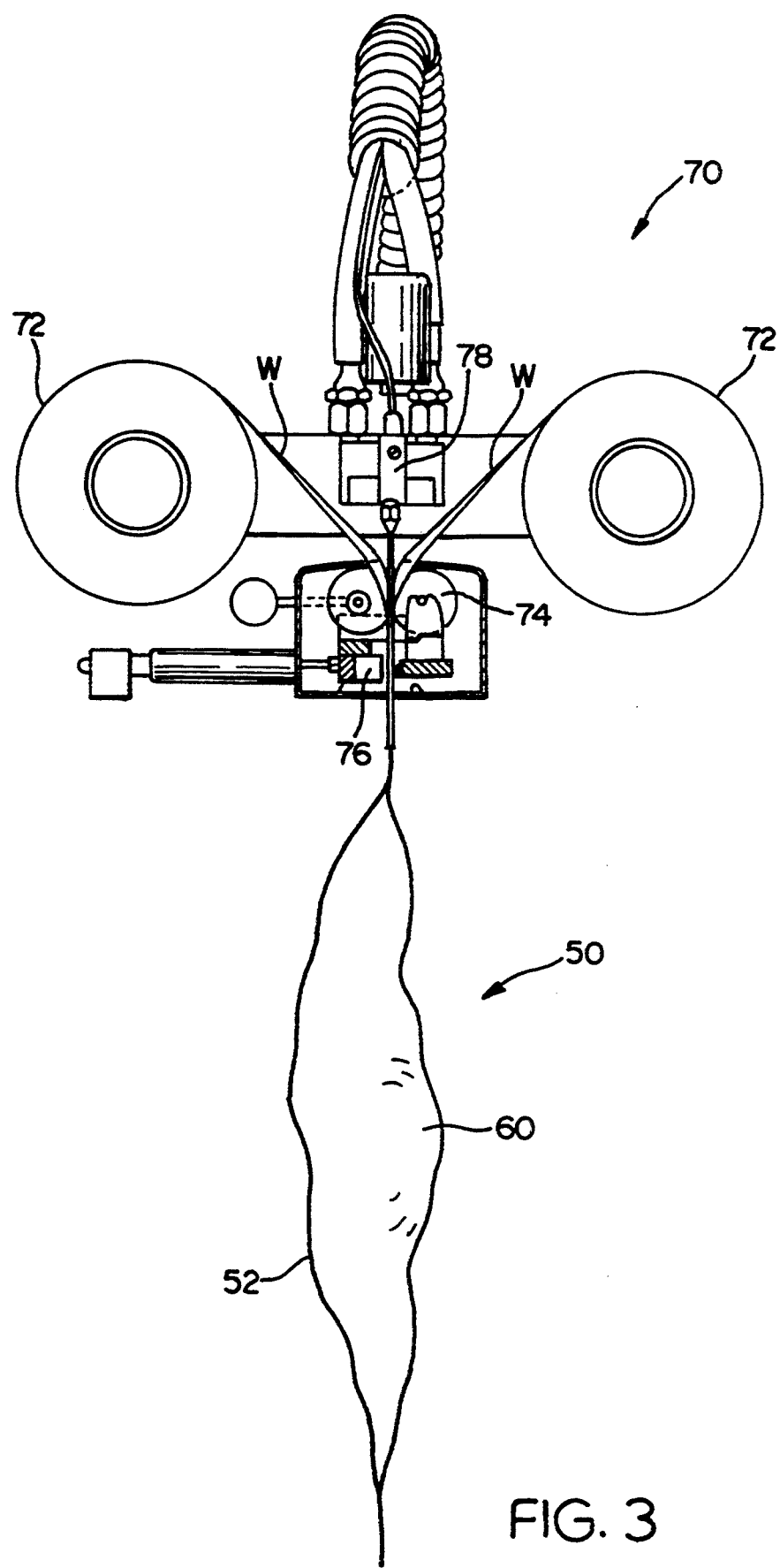
FIG. 3 is a partially sectioned and schematic side elevational view of the drive roll means and the first and second heat sealing means of the invention.

The shipping support 50 may be manufactured using equipment for forming foam cushions such as manufactured by Seal Air Corporation, Danbury, Conn. This system is described in U.S. Pat. Nos. 4,854,109 to Pinarer et al. and 4,938,007 to Sperry, the disclosures of which are hereby incorporated by reference. As shown in FIG. 3, an apparatus 70 may be provided for forming the shipping support 50. In the apparatus 70, webs W are advanced from the supply rolls 72 by a drive roll means 74 which defines a nip for receiving the webs W therebetween, and for guiding the advancing webs W downwardly in a converging relationship and into opposing face-to-face contact at the nip. Heat sealing means 76 are positioned along the path of travel and immediately adjacent the drive roll means 74 for heat sealing the longitudinal side edges 56 of the advancing plastic webs W. A nozzle 78 is provided for periodically introducing a predetermined amount of foamable composition 60 between the opposing webs W at a location upstream of the location at which the two webs W are guided into the nip, such that the foamable composition 60 is deposited into each shipping support 50 being formed. Means are also provided for transversely sealing and severing the webs W to form separate shipping supports 50.

Figure 4:
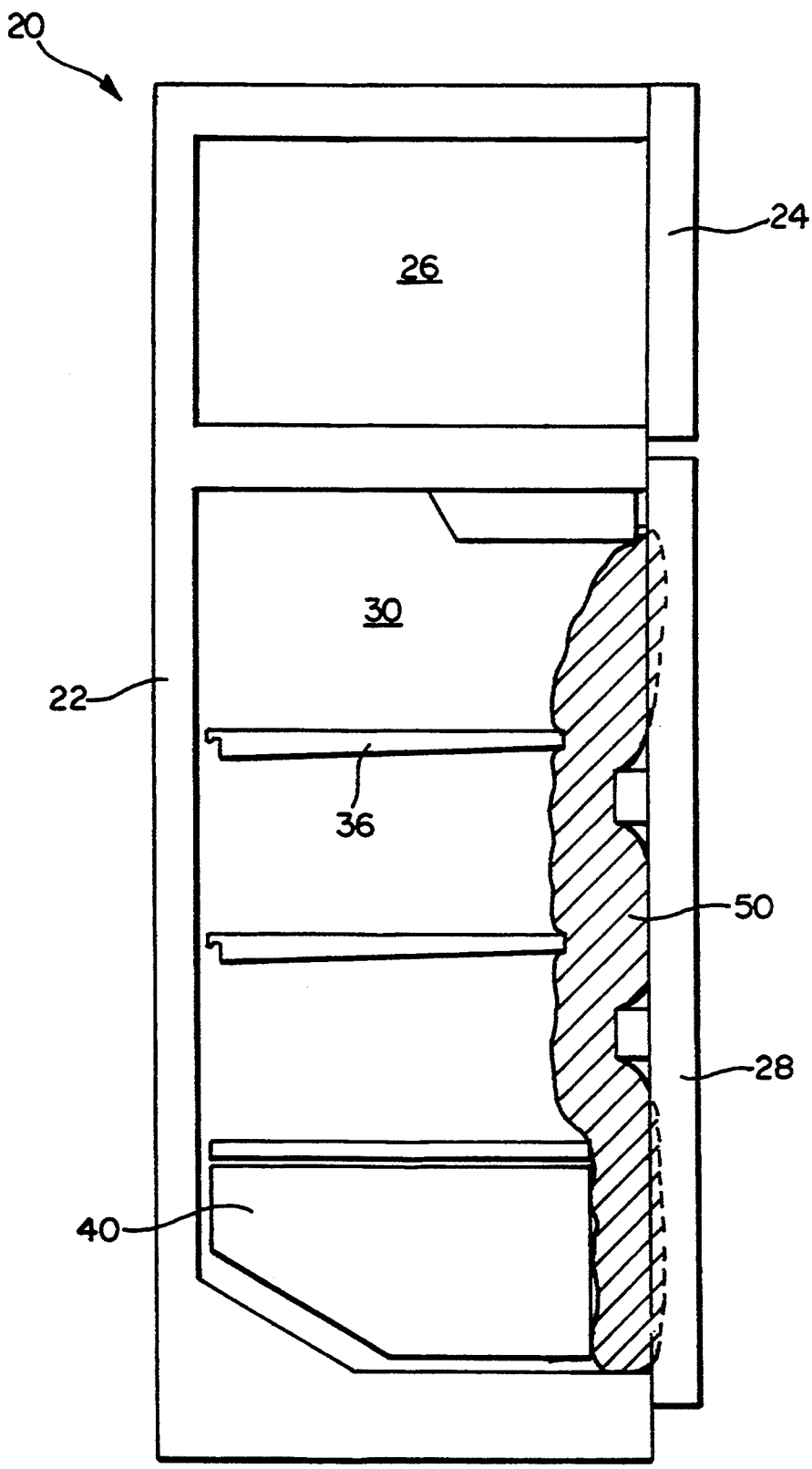
FIG. 4 is a sectional, side elevational view of a refrigerator having its front doors closed and including the packing support of the present invention.

Once formed, as contemplated by the inventors, the shipping support 50 is secured to the second openable door 28 of the refrigerator 20. This may be accomplished by using an adhesive element such as a segment of conventional tape 80. At this stage, the expandable foam 60 injected within the conformable bag 52 is still in a liquid form and in the active process of foaming and expanding. The second openable door 28 is then closed while the expandable foam 60 expands to surround and conform to the configuration of the shelves 36 and the drawers 38, 40 and 42. As shown in FIG. 4, a supportive and protective, relatively rigid foam shipping support is formed. The shipping support 50 conforms to the moveable articles within the refrigerator 20 and secures the moveable articles during shipping to prevent damage.

Figure 5:
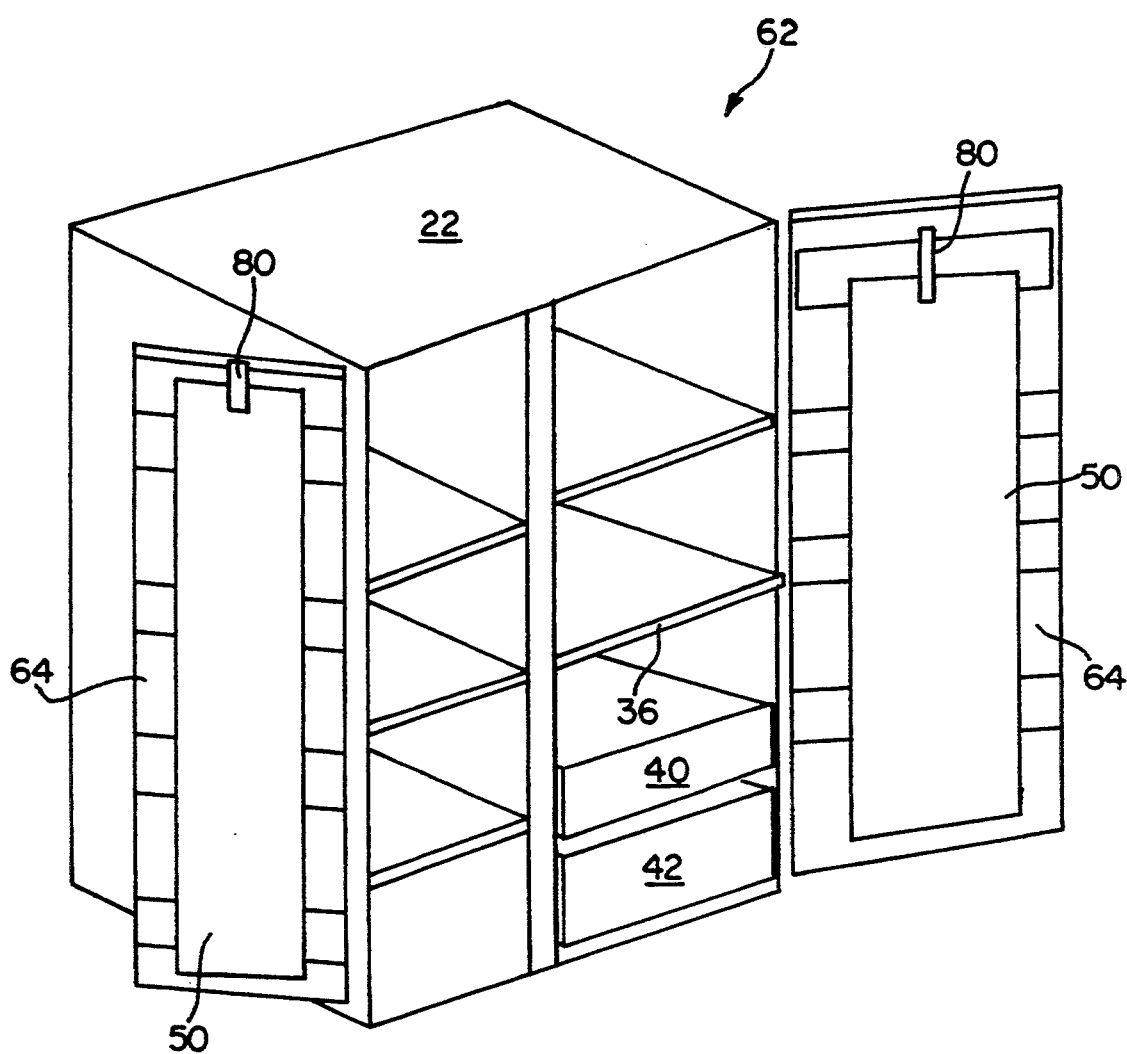
FIG. 5 is a top, front and side perspective view of a side-by-side refrigerator including packing supports in accordance with the present invention.

In an alternative embodiment, FIG. 5 illustrates the use of the shipping support 50 on a side-by-side construction refrigerator 62. As shown, shipping support 50 may be secured to each inner door 64 of the refrigerator 62. In this fashion, both sides of the side-by-side refrigerator 62 may be provided with a shipping support 50 as described above for securing moveable articles with the refrigerator 62 during shipment.

Although the present invention has been described with reference to specific embodiments, those of skill in the Art will recognize that changes may be made thereto without departing from the scope and spirit of the invention as set forth in the appended claims. Although a specific embodiment of our invention may be for use in a refrigerator, it may be easily understood that this invention may be applied in appliances other than refrigerators.

We claim:

1. A shipping system for an appliance, said appliance having a cabinet defining an interior compartment, a plurality of moveable articles disposed within said interior compartment and a door hingedly mounted to said cabinet for sealingly closing said interior compartment, said door being adjacent the terminal ends of said moveable articles when in the closed position, said shipping system comprising:
   a shipping support including:
      a conformable bag, said conformable bag having sealed ends; and
      expandable foam material contained in said conformable bag, said conformable bag being conformed to said moveable articles and to said interior compartment for retaining said conformable bag in a predetermined location within said interior compartment; and
   an adhesive element for adhering said conformable bag to said door before said expandable foam contained within said conformable bag has completely formed such that said foamable composition conforms to the configuration of said shelves and said door.

2. The shipping system of claim 1, wherein said conformable bag is a thin polyfilm bag.

3. The shipping support of claim 1, wherein said appliance is a refrigerator and said moveable articles include a combination of shelves and drawers.

4. The shipping system of claim 1, wherein said conformable bag includes a plurality of venting orifices.

5. The shipping support of claim 1, wherein said sealed ends are heat-sealed.

6. The shipping system of claim 1 wherein said refrigerator includes a plurality of said interior compartments wherein each of said interior compartments contains moveable articles and receives one of said shipping support.

7. A method of supporting moveable articles disposed within an interior compartment of an appliance, said method retaining each of said moveable articles against movement within the interior compartment during shipment of said appliance, said appliance further having a door hingedly mounted for sealingly closing said interior compartment, said door being adjacent the terminal ends of said moveable articles when in the closed position, said method comprising:
   providing a conformable bag having sealed ends;
   filling said conformable bag with an expandable foam;
   securing said conformable bag within said compartment before said expandable foam bag has completely expanded and formed;
   closing said door such that said expandable foam expands and conforms to the configuration of said shelves and said door such that said shelves are securely retained within said interior compartment during shipment; and
wherein the step of securing said conformable bag within said compartment further comprises taping said conformable bag to said door.

* * * * *